(No Model.)
J. D. WHITNEY.
BUCKBOARD.
No. 360,940. Patented Apr. 12, 1887.
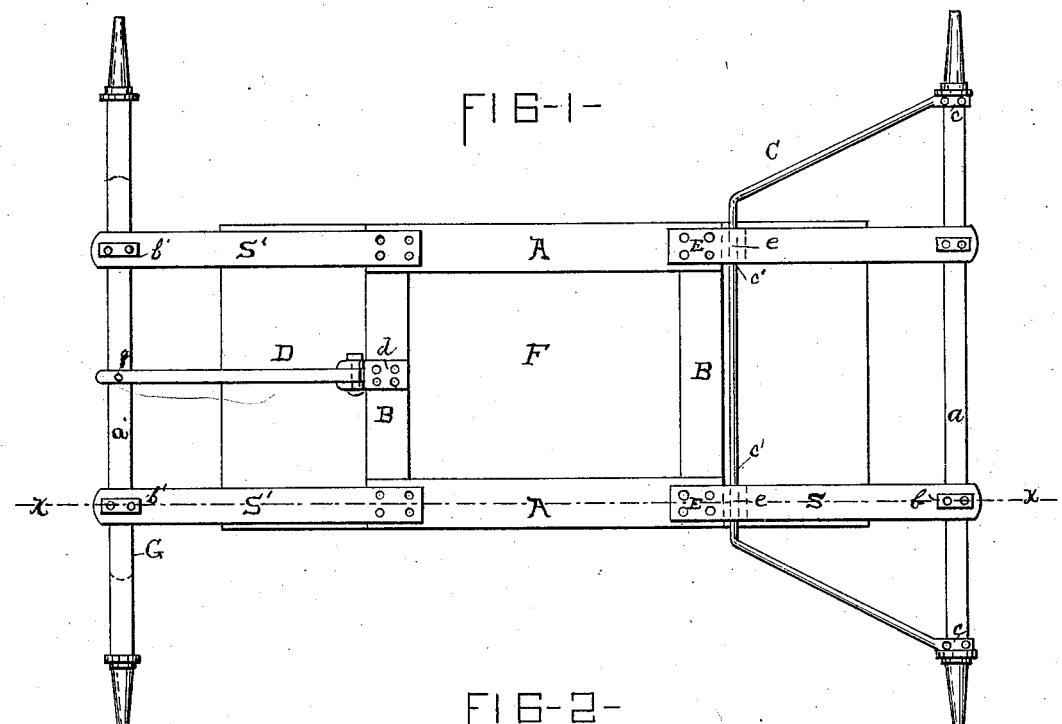
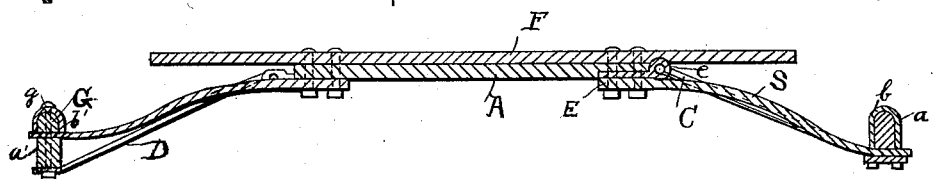
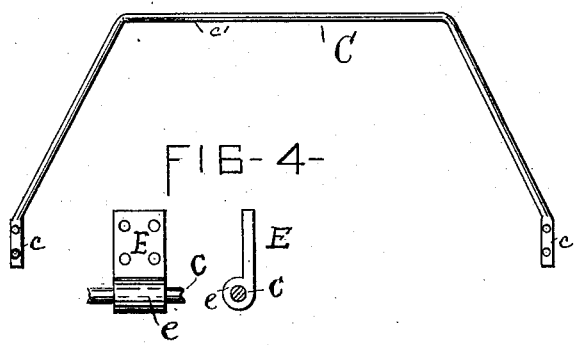
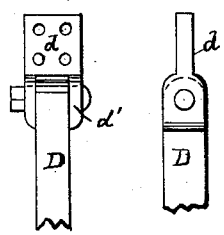
WITNESSES—
A. D. Allen
M. J. Dolphin
INVENTOR—
Jonah D. Whitney
per Hey & Gibbs
Attys.

UNITED STATES PATENT OFFICE.

JONAH D. WHITNEY, OF SYRACUSE, NEW YORK.

BUCKBOARD.

SPECIFICATION forming part of Letters Patent No. 360,940, dated April 12, 1887.

Application filed October 11, 1886. Serial No. 215,858. (No model.)

*To all whom it may concern:*

Be it known that I, JONAH D. WHITNEY, of Syracuse, in the county of Onondaga, in the State of New York, have invented new and useful Improvements in Buckboards, of which the following, taken in connection with the accompanying drawings, is a full, clear, and exact description.

My invention relates to that class of vehicles termed "buckboards," and the object is to provide an equalizing-bar connected to the rear axle to equalize the tension on the rear springs, and thereby guide or steady the action of the seat support or body, making the same easy for the occupant of the vehicle, and also to provide a forward equalizing draft-bar to secure the same result to the forward end of the vehicle.

To this end, then, the invention consists in the combination, with the buckboard-frame, of parallel side springs secured, respectively, to the bolster, rear axles, and buckboard-frame, and an equalizing-bar rigidly secured to the axle at its extremities, and its loop or bail portion movably connected to the buckboard-frame.

It consists, also, in details of construction and arrangement of the parts, all as hereinafter described, and pointed out in the claim.

In specifying my invention reference is had to the accompanying drawings, in which like letters indicate corresponding parts in all the views.

Figure 1 is an inverted plan showing the under side of my improved buckboard-wagon. Fig. 2 is a longitudinal section taken on line *x x*, Fig. 1. Fig. 3 is a detached view of the equalizing-bar, and Fig. 4 is a detached detail of the guide-eye through which the equalizing-bar passes; and Fig. 5 is a detached plan and side view of the forward draft-equalizing bar and attachment for securing the same to the buckboard-frame.

A A B B is the frame on which the buckboard F is mounted.

S S S' S' are the springs connecting the buckboard to the rear axle and bolster, respectively.

G is the bolster. The buckboard-frame, composed of the side bars and cross-bars, A B, is connected to the rear axle by means of the springs S S, clipped on the rear axle, *a*, at *b*, Figs. 1 and 2, and secured to the buckboard and buckboard-frame, as best shown at Fig. 2.

C is the equalizing-bar, formed of iron or steel or any other suitable material, as best shown at Fig. 3, the extremities thereof, *c c*, being flattened to secure the same on the axle, as shown in Fig. 1. The portion *c'* passes through guide-eyes *e*, formed in the attaching-plates E, and the said plates E are bolted to the side bars, A A, of the buckboard-frame, as shown in Figs. 1 and 2. The equalizing-bar, hung to the buckboard-frame in the manner specified and connected rigidly to the axle, serves to equalize the deflection of the springs S S, and at the same time steadies the buckboard and causes the same to be firmly braced against lateral motion, the guide-eyes and attachments to the buckboard-frame permitting a free play of the springs and equalizing-bar for this purpose.

The forward springs, S' S', are secured to the forward end of the side bars, A, and the buckboard F, as shown at Fig. 2, and to the bolster G by clips *b'*, and the king-bolt *g* passes through the axle *a'* and the bolster G, as shown at Fig. 2. The forward draft-bar, D, is secured to the axle *a'*, as best shown in Fig. 1, and is connected to the cross-bar B of the buckboard-frame by a shackle-plate, *d*, the bar D being pivoted in the shackle *d'*, as shown in the detached view, Fig. 5.

The office of the forward draft-equalizing bar is to serve to equalize the action of the forward springs, and at the same time brace the same rectilineally and tie the forward end of the buckboard-frame to the axle.

It will be observed that the king-bolt serves as a pivot on which the forward running-gear of the vehicle may turn, and the springs S S' are curved upward, as shown at Fig. 2, elevating the buckboard F above the rear axle and bolster, and the said springs may be either flat springs or leaf-springs, made of the required stiffness for the weight which the vehicle is designed to carry.

By my invention a compact and neat buckboard is produced possessing very easy movement on the springs without much lateral play, and at the same time being compact, strong, and durable. Furthermore, intermediate and bracing springs, as formerly employed in spring-buckboards, are dispensed with, and better results thereby secured both in economy of manufacture and ease in the riding of the vehicle.

I am aware that equalizing-bars of the form illustrated herein have been used in connection with springs known as the "Concord" pattern; but in that case the extremities of the equalizing-bar were pivoted to the rear axle, so as to allow a free movement of the bar on its pivot on the axle. I do not, therefore, broadly claim the equalizing-bar in combination with a vehicle-spring; but What I do claim as new, and desire to secure by Letters Patent, is—

In a buckboard, the combination, with the buckboard-frame and the parallel side springs, S, of the bail-shaped equalizing-bar C, made in one piece, connected rigidly at its extremities $c\ c$ to the axle $a$, and extending continuously across the buckboard through the guide-eye $e$, substantially as and for the purpose set forth.

In testimony whereof I have hereunto signed my name, in the presence of two attesting witnesses, at Syracuse, in the county of Onondaga, in the State of New York, this 9th day of October, 1886.

JONAH D. WHITNEY.

Witnesses:
FREDERICK H. GIBBS,
E. C. CANNON.